(12) United States Patent
Meeramohideen Mohamed et al.

(10) Patent No.: US 12,007,888 B2
(45) Date of Patent: Jun. 11, 2024

(54) TECHNIQUES TO GROUP MEDIA BLOCKS

(71) Applicant: Micron Technology, Inc., Boise, ID (US)

(72) Inventors: Nabeel Meeramohideen Mohamed, Round Rock, TX (US); Greg Alan Becker, Austin, TX (US); Steven Andrew Moyer, Round Rock, TX (US)

(73) Assignee: Micron Technology, Inc., Boise, ID (US)

( * ) Notice: Subject to any disclaimer, the term of this patent is extended or adjusted under 35 U.S.C. 154(b) by 88 days.

(21) Appl. No.: 17/891,315

(22) Filed: Aug. 19, 2022

(65) Prior Publication Data

US 2024/0061772 A1 Feb. 22, 2024

(51) Int. Cl.
*G06F 12/02* (2006.01)

(52) U.S. Cl.
CPC .. *G06F 12/0292* (2013.01); *G06F 2212/1032* (2013.01); *G06F 2212/65* (2013.01)

(58) Field of Classification Search
None
See application file for complete search history.

(56) References Cited

U.S. PATENT DOCUMENTS

| | | | | |
|---|---|---|---|---|
| 4,758,951 A | * | 7/1988 | Sznyter, III | G06F 12/0882 711/E12.068 |
| 2007/0043771 A1 | * | 2/2007 | Ludwig | H04L 61/457 |
| 2017/0123996 A1 | * | 5/2017 | Kishan | G06F 12/1009 |
| 2018/0316611 A1 | * | 11/2018 | Sheldon | H04L 45/72 |
| 2020/0341656 A1 | * | 10/2020 | Chawla | G06F 16/9027 |

\* cited by examiner

*Primary Examiner* — Yaima Rigol
(74) *Attorney, Agent, or Firm* — Holland & Hart LLP

(57) ABSTRACT

Methods, systems, and devices for techniques to group media blocks are described. In some cases, a computing system may generate a memory map for a preconfigured size or chunk of data. For example, the computing system may divide files of media blocks into a set of fixed sized chunks of consecutive media blocks. Upon an application requesting a memory map for a set of media blocks, a storage layer of the computing system may generate a sub-map of the memory map for each chunk of data containing a media block of the set of requested media blocks. In some cases, the computing system may assign the chunks of data a continuous range of addresses in the virtual address space of the application. Upon generating the memory map, the storage layer may return an indication of the virtual address ranges of the requested media blocks to the application.

25 Claims, 5 Drawing Sheets

TECHNIQUES TO GROUP MEDIA BLOCKS

FIELD OF TECHNOLOGY

The following relates to one or more systems for memory, including techniques to group media blocks.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read (e.g., sense, detect, retrieve, identify, determine, evaluate) a stored state in the memory device. To store information, a component may write (e.g., program, set, assign) the state in the memory device.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

Figure 1:
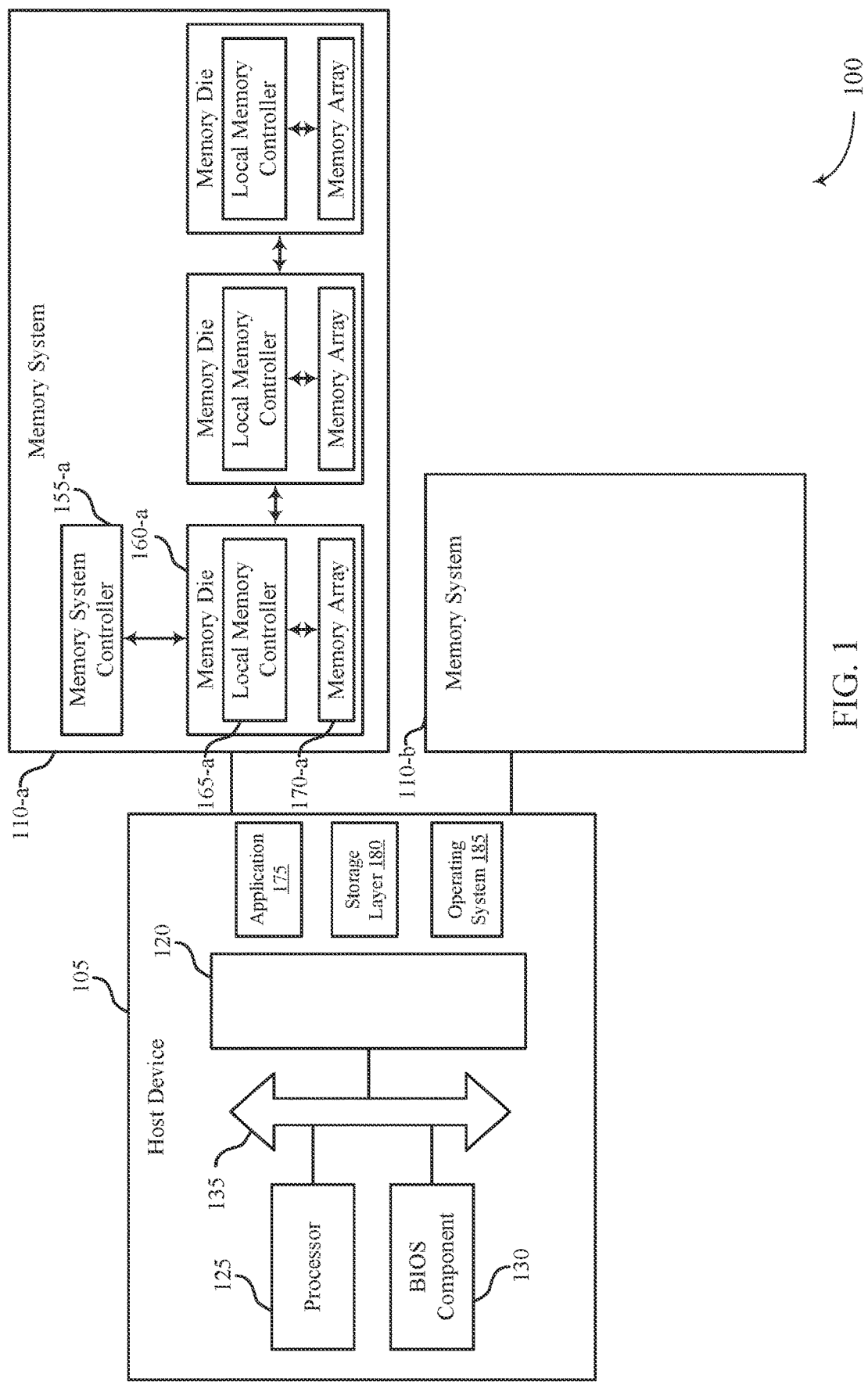
FIG. 1 illustrates an example of a system that supports techniques to group media blocks in accordance with examples as disclosed herein.

Some computing systems may make use of databases stored across multiple types of memory devices (e.g., magnetic hard disks, ROM devices, FeRAM devices, flash memory, PCM devices, self-selecting memory, chalcogenide memory technologies, solid states drives (SSDs)). A database may store data in the form of files containing media blocks, which may include a set of keys and a corresponding set of values. In some cases, to access media blocks within files, a computing system may memory map all or a portion of the file to obtain a virtual address for the media block (e.g., may associate a range of virtual addresses in a virtual address space for the application with a physical location in the memory device), which the application may then use to access the media block. In some cases, a computing system may generate a memory map for a whole file containing the media block, which may consume a relatively high portion of the virtual address space of the application. Alternatively, a computing system may generate a memory map for the media block without generating a memory map for the whole file containing the media block, which may reduce virtual address space consumption, but may result in a large quantity of memory maps (e.g., if the application requests many media blocks), which may increase overhead associated with managing memory maps. Such approaches may reduce performance, size, or scalability of memory mapped databases and other large-scale data storage systems.

As described herein, a computing system may generate a memory map for a preconfigured size or quantity of media blocks (e.g., a subset of media blocks). For example, the computing system may divide files of media blocks into a set of subsets of consecutive media blocks, and each subset may have a same quantity of media blocks. Upon an application requesting a memory map for a set of media blocks, a storage layer of the computing system may generate a sub-map of the memory map for each subset of media blocks containing a media block of the set of requested media blocks. In some cases, the computing system may assign the subsets of media blocks a continuous range of addresses (e.g., virtual addresses) in the virtual address space of the application. Upon generating the memory map, the storage layer may return an indication of the virtual address ranges of the requested media blocks to the application. That is, the storage layer may transmit an indication of the virtual addresses corresponding to the requested media blocks in the generated memory map to the application.

Features of the disclosure are initially described in the context of systems and dies as described with reference to FIG. 1. Features of the disclosure are described in the context of a system and process flow as described with reference to FIGS. 2 through 3. These and other features of the disclosure are further illustrated by and described with reference to an apparatus diagram and flowcharts that relate to techniques to group media blocks as described with reference to FIGS. 4 through 5.

FIG. 1 illustrates an example of a system 100 that supports techniques to group media blocks in accordance with examples as disclosed herein. The system 100 may include a host device 105, a memory system 110-a, and a plurality of channels coupling the host device 105 with the memory system 110-a. The system 100 may include one or more memory devices 110-a, but aspects of the one or more memory devices 110-a may be described in the context of a single memory device (e.g., memory system 110-a).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory system 110-a may be a component of the system 100 that is operable to store data for one or more other components of the system 100.

Portions of the system 100 may be examples of the host device 105. The host device 105 may be an example of a processor (e.g., circuitry, processing circuitry, a processing component) within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or any combination thereof that implements the functions of an external memory controller 120. In some examples, the external memory controller 120 may be referred to as a host (e.g., host device 105).

A memory system 110-a may be an independent device or a component that is operable to provide physical memory addresses/space that may be used or referenced by the system 100. In some examples, a memory system 110-a may be configurable to work with one or more different types of host devices. Signaling between the host device 105 and the memory system 110-a may be operable to support one or more of: modulation schemes to modulate the signals, various pin configurations for communicating the signals, various form factors for physical packaging of the host device 105 and the memory system 110-a, clock signaling and synchronization between the host device 105 and the memory system 110-a, timing conventions, or other functions.

The memory system 110-a may be operable to store data for the components of the host device 105. In some examples, the memory system 110-a (e.g., operating as a secondary-type device to the host device 105, operating as a dependent-type device to the host device 105) may respond to and execute commands provided by the host device 105 through the external memory controller 120. Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide functionality (e.g., control functionality) for the system 100 or the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or any combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include instructions (e.g., a program, software) stored in one or more of read-only memory (ROM), flash memory, or other non-volatile memory.

The memory system 110-a may include a memory system controller 155-a and one or more memory dies 160-a (e.g., memory chips) to support a capacity (e.g., a desired capacity, a specified capacity) for data storage. Each memory die 160-a (e.g., memory die 160-a-a, memory die 160-a-b, memory die 160-a-N) may include a local memory controller 165-a (e.g., local memory controller 165-a-a, local memory controller 165-a-b, local memory controller 165-a-N) and a memory array 170-a (e.g., memory array 170-a-a, memory array 170-a-b, memory array 170-a-N). In some examples, a local memory controller 165-a may be a separate controller from the memory system controller 155-a. For example, the local memory controller 165-a may be present on and control the memory die 160-a, while the memory system controller 155-a may control the memory system 110-a. Additionally or alternatively, a memory die 160-a may not include a local memory controller 165-a. A memory array 170-a may be a collection (e.g., one or more grids, one or more banks, one or more tiles, one or more sections) of memory cells, with each memory cell being operable to store one or more bits of data. A memory system 110-a including two or more memory dies 160-a may be referred to as a multi-die memory or a multi-die package or a multi-chip memory or a multi-chip package. In some cases, the memory die 160 may be non-volatile memory devices such as ferroelectric RAM (FeRAM), magnetic RAM (MRAM), resistive RAM (RRAM), flash memory, phase change memory (PCM), self-selecting memory, chalcogenide memory technologies, not-or (NOR), or not-and (NAND) memory devices.

The memory system controller 155-a may include components (e.g., circuitry, logic) operable to control operation of the memory system 110-a. The memory system controller 155-a may include hardware, firmware, or instructions that enable the memory system 110-a to perform various operations and may be operable to receive, transmit, or execute commands, data, or control information related to the components of the memory system 110-a. The memory system controller 155-a may be operable to communicate with one or more of the external memory controller, the one or more memory dies 160-a, or the processor 125. In some examples, the memory system controller 155-a may control operation of the memory system 110-a described herein in conjunction with the local memory controller 165-a of the memory die 160-a.

A local memory controller 165-a (e.g., local to a memory die 160-a) may include components (e.g., circuitry, logic) operable to control operation of the memory die 160-a. In some examples, a local memory controller 165-a may be operable to communicate (e.g., receive or transmit data or commands or both) with the memory system controller 155-a. In some examples, a memory system 110-a may not include a memory system controller 155-a, and a local memory controller 165-a or the external memory controller 120 may perform various functions described herein. As such, a local memory controller 165-a may be operable to communicate with the memory system controller 155-a, with other local memory controllers 165-a, or directly with the external memory controller 120, or the processor 125, or any combination thereof. Examples of components that may be included in the memory system controller 155-a or the local memory controllers 165-a or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other components operable for supporting described operations of the memory system controller 155-*a* or local memory controller 165-*a* or both.

The external memory controller may be operable to enable communication of information (e.g., data, commands, or both) between components of the system 100 (e.g., between components of the host device 105, such as the processor 125, and the memory system 110-*a*). The external memory controller may process (e.g., convert, translate) communications exchanged between the components of the host device 105 and the memory system 110-*a*. In some examples, the external memory controller, or other component of the system 100 or the host device 105, or its functions described herein, may be implemented by the processor 125. For example, the external memory controller may be hardware, firmware, or software, or some combination thereof implemented by the processor 125 or other component of the system 100 or the host device 105. In some examples, the external memory controller, or its functions described herein, may be implemented by one or more components of a memory system 110-*a* (e.g., a memory system controller 155-*a*, a local memory controller 165-*a*) or vice versa.

In some examples, the host device 105 may execute an application 175, which may make use of a database stored in a memory system 110-*a*. The application 175 may communicate, via a storage layer 180, with an operating system 185 of the host device 105 to manage mappings between virtual addresses accessible by the application 175 and physical locations of data, such as media blocks, stored in the memory system 110-*a*. For example, the application 175 may issue a request for virtual addresses corresponding to one or more media blocks to the storage layer 180, and the storage layer 180 may obtain an allocation in a virtual address space of a second memory system 110-*b* (e.g., a main memory of the host device 105), along with an indication of a virtual address range for the requested media blocks in the virtual address space from the operating system 185. The storage layer 180 may then return an indication of the virtual address ranges for the requested media blocks to the application 175.

In some examples, a host device 105 may generate a memory map for a preconfigured size or chunk of data. For example, the host device 105 may divide files of media blocks stored in a memory system 110-*a* into a set of fixed sized subsets of consecutive media blocks. Upon an application 175 requesting a memory map for a set of media blocks, a storage layer 180 of the host device 105 may generate a sub-map of the memory map for each subset of data containing a media block of the set of requested media blocks. In some cases, the host device 105 may assign the sub-maps to a continuous range of addresses (e.g., virtual addresses) in the virtual address space of a second memory system 110-*b* for the application 175. Upon generating the memory map, the storage layer 180 may return an indication of the virtual address ranges of the requested media blocks to the application 175. That is, the storage layer 180 may transmit an indication of the virtual addresses corresponding to the requested media blocks in the generated memory map to the application 175.

Figure 2:
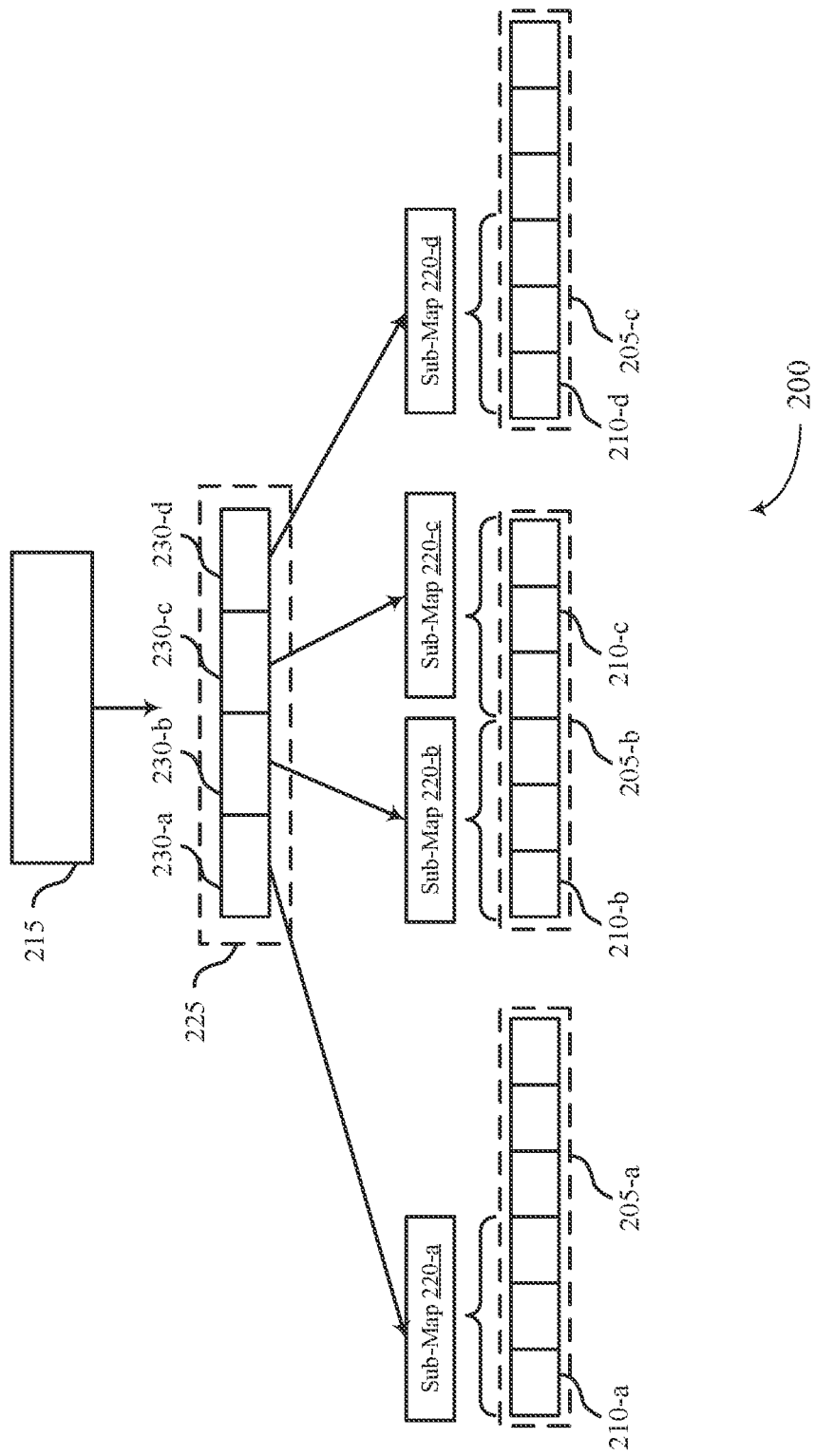
FIG. 2 illustrates an example of a system that supports techniques to group media blocks in accordance with examples as disclosed herein.

FIG. 2 illustrates an example of a system 200 that supports techniques to group media blocks in accordance with examples as disclosed herein. In some examples, a host system may implement the system 200 as part retrieving data of a database stored across multiple types of memory devices, such as NAND devices, magnetic hard disks, ROM devices, FeRAM devices, flash memory, PCM devices, self-selecting memory, chalcogenide memory technologies, SSDs, or other non-volatile memory device, which may be referred to as storage devices.

The database may store the data in one or more files 205 containing sets of keys and corresponding values. In some cases, a file 205 may include one or more media blocks 210 containing data, such as one or more key blocks containing keys, one or more value blocks containing values corresponding to keys of the key blocks, a header block containing metadata for the file 205, or any combination thereof. In some cases, a header block for a file 205 may include metadata for media blocks 210 stored in the file 205. For example, the header block may include an indication of identifiers for media blocks 210 stored in the file 205, and may include a mapping between the identifiers and the associated addresses of the media blocks 210. In some examples, the size of a media block 210 (e.g., a size of data of the media block 210) may be fixed, and may correspond to a quantity of memory cells of a non-volatile memory device for the database, such as a quantity of memory cells corresponding to one or more pages or blocks of memory cells of a NAND memory device. For example, a media block 210 may correspond to 32 megabytes of data.

In some cases, the database may store the media blocks 210 using a log structured merge (LSM) tree. For example, the media blocks 210 may be examples of read-only data, and may be added by the host system to a first layer of the database. As the first layer becomes populated with media blocks 210, the database may merge media blocks 210 into files 205, which may be transferred to one or more lower levels of the data base. In some cases, to access media blocks within files, the operating system of the host system may memory map all or a portion of the file to obtain a virtual address for the media block (e.g., may associate a range of virtual addresses in a virtual address space for the application with a physical location in the memory device), which the application may then use to access the media block. The memory map may be stored in a virtual address space of a higher-tier memory device (e.g., a volatile memory device having a higher access speed than the non-volatile memory devices used to store data of the database), such as a DRAM memory device or main memory of the host system. In some cases, a set of addresses (e.g., virtual addresses) corresponding to the requested media blocks may be referred to as a memory map, and associating virtual addresses with a physical location of data in a storage device may be referred to as memory mapping the data.

By way of example, an application running on the host system may issue a request 215 to a storage layer of the host system for a memory map of a set of media blocks 210, such as the media block 210-*a*, the media block 210-*b*, the media block 210-*c*, the media block 210-*d*, or any combination thereof. For example, the host system may query the database to retrieve values associated with keys stored in the media blocks 210-*a* through 210-*d*. In some cases, as part of issuing the request 215, the application may issue an identifier of the requested media blocks 210 to the storage layer. The storage layer may be configured to use an identifier of a media block 210 to determine a physical location (e.g., a physical address within a storage device) of the media block 210.

In response to the request, the storage layer may generate a cache map 225 for the requested media blocks 210. In some cases, the cache map 225 may include an indication of a virtual address range 230 for each media block 210. For example, the cache map 225 may include a virtual address range 230-a for the media block 210-a, a virtual address range 230-b for the media block 210-b, a virtual address range 230-c for the media block 210-c, a virtual address range 230-d for the media block 210-d, or any combination thereof. In some examples, a virtual address range 230 may include an indication of a starting virtual address and an ending virtual address for a memory mapped media block 210. Additionally or alternatively the virtual address range 230 may include the indication of the starting virtual address along with an indication of the size of the corresponding medial block 210.

The media blocks 210 may be stored in a continuous range of addresses (e.g., physical addresses) or locations of a file 205, or may be stored in a discontinuous range of addresses of a file 205 or across multiple files 205. For example, the media block 210-a may be stored in a file 205-a, the media blocks 210-b and 210-c may be stored in file 205-b, and the media block 210-d may be stored in a file 205-c. In some examples, keys and values corresponding to the keys may be stored in a same media block 210 and file 205, or may be stored in separate media blocks 210 and separate files 205. For example, a key of a key-value pair may be stored in the media block 210-a of file 205-a, while a value of the key-value pair may be stored in the media block 210-b of file 205-b.

In some cases, the virtual address ranges 230 may each be a portion of a larger sub-map 220. For example, a sub-map 220 may include a range of virtual addresses corresponding to a fixed quantity of media blocks 210 of the files 205. In some examples, a sub-map 220 may correspond to the virtual address range for a subset of media blocks 210 of a file having a continuous range of addresses (e.g., physical addresses) of a storage device storing the file 205 containing the sub-map 220. Accordingly, each requested media block 210 may be included in a subset, and a virtual address range 230 for each requested media block 210 may be included in a sub-map 220 (e.g., the virtual address range 230-a may be included in a sub-map 220-a of the file 205-a, the virtual address range 230-b may be included in a sub-map 220-b of the file 205-b, the virtual address range 230-c may be included in a sub-map 220-c of the file 205-b, and the virtual address range 230-d may be included in a sub-map 220-d of the file 205-c).

In some cases, the storage layer may divide each of the files 205 into the set of fixed-size chunks or subsets of media blocks 210. For example, a subset may include a fixed quantity of media blocks 210 or may include a fixed size of data. In some examples, a subset may correspond to a continuous range of addresses (e.g., physical addresses) of a storage device storing the file 205 containing the subset.

In some cases, the storage layer may determine whether each of subsets containing the requested media blocks 210 have been memory mapped (e.g., whether each of the subsets has been allocated a virtual address range of a sub-map 220 in the virtual address space). If a subset has not been memory mapped, the storage layer may issue an instruction to the operating system to memory map the subset. Accordingly, the storage layer may receive an allocation of the virtual address space from the operating system for the subset, and the operating system may associate virtual addresses of the allocation with physical locations of media blocks 210 if the subset generates a sub-map 220.

Upon receiving the allocation, the storage layer may determine the virtual address ranges 230 of the media blocks 210 included in the memory mapped subsets, and may add the virtual address ranges to the cache map 225.

After generating the cache map 225, the storage layer may return the cache map 225 to the application, for example as a result of a function call by the application, and the application may use the cache map 225 to access the media blocks 210. For example, the application may issue a read command for data (e.g., for a value associated with a key of the media blocks 210) which includes a virtual address range 230 of the cache map 225, and the operating system may retrieve the data from the main memory of the host system.

In some cases, the system 200 may support multiple cache maps 225. For example, the application may issue a second request 215 to the storage layer for a second set of media blocks 210. In such cases, the storage layer may determine that a sub-map 220 containing one or more of the requested media blocks 210 may have already been memory mapped, and thus may already be associated with a virtual address range. In such cases, the storage layer may increment a counter associated with the sub-map 220 (e.g., may reference count the sub-map 220) to track references to the sub-map 220. The storage layer may identify the virtual address range 230 of the requested media block 210 and return the virtual address range 230 in response to the second request 215.

In some examples, the application may issue an unmap command for a media block 210. In such cases, the storage layer may decrement the counter associated with a sub-map 220 containing the media block 210. If the value of the counter is greater than a threshold (e.g., greater than zero), the storage layer may determine that another media block 210 of the sub-map 220 may still be active (e.g., that the application may have issued a request for the other media block 210, but has not issued an unmap command for the other media block 210). Alternatively, if the value of the counter satisfies the threshold (e.g., if the value of the counter is zero), the storage layer may determine that no media blocks 210 of the sub-map 220 are active. Accordingly, the storage layer may instruct the operating system to unmap the sub-map 220, for example by freeing virtual addresses associated with the sub-map 220.

Figure 3:
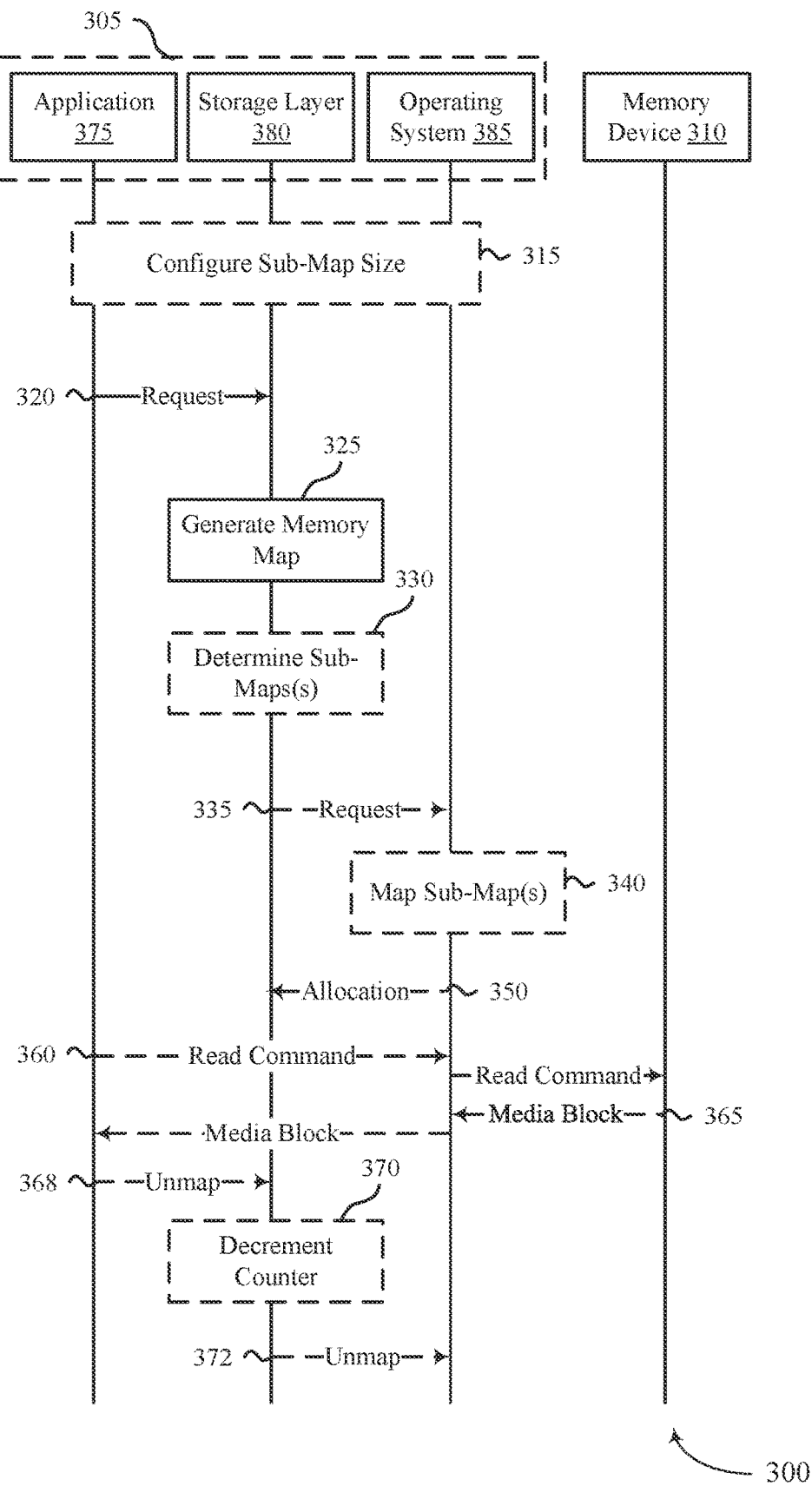
FIG. 3 illustrates an example of a process flow that supports techniques to group media blocks in accordance with examples as disclosed herein.

FIG. 3 illustrates an example of a process flow 300 that supports techniques to group media blocks in accordance with examples as disclosed herein. Operations of the process flow 300 may be performed by a host device 305 and one or more memory devices 310, which may be examples of the respective devices described with reference to FIGS. 1 and 2. Aspects of the process flow 300 may be implemented by one or more controllers (e.g., one or more respective controllers at a host device 305 or a memory device 310), among other components. Additionally, or alternatively, aspects of the process flow 300 may be implemented as instructions stored in memory (e.g., respective firmware stored in a memory of or coupled with a host device 305 or a memory device 310). For example, the instructions, when executed by a controller, may cause a controller to perform one or more operations of the process flow 300.

The host device 305 may implement aspects of the system 200 to access data of a database stored in the memory device 310. For example, an application 375 running on the host device 305 may access an LSM tree having a set of files containing media blocks stored in a non-volatile or persistent memory device, such as the memory device 310. In some cases, the application 375 may query the database using one or more keys to retrieve one or more corresponding values, the keys and values being stored in media blocks of the database. To access the media blocks stored in the memory device 310, the host device 305 may, via a storage layer 380 and an operating system 385, memory map portions of files (e.g., sub-maps) containing media blocks of interest, for example by maintaining a virtual address space for the memory mapped portions.

In some examples, at 315, the host device 305 may configure a size of the sub-maps of the files stored in the memory device 310. For example, as part of an initialization of the application 375 (e.g., as part of starting the application 375, booting up the application 375), the host device may identify a quantity of media blocks for each subset of media blocks of a file, or may identify a data size (e.g., an amount of data) for each subset. Accordingly, subsequent memory maps of sub-maps requested by the application 375 may be of the configured size.

At 320, the application 375 may issue a request for a cache map of one or more media blocks to the storage layer 380. In some examples, the request may include a vector of media block identifiers, each media bock identifier corresponding to a requested media block. Accordingly, at 325, the storage layer 380 may generate a memory map which includes the requested media blocks. For example, the storage layer 380 may create a cache map as described with reference to FIG. 2 to hold virtual address ranges of a virtual address space associated with the application 375.

At 330, as part of generating the memory map, the storage layer 380 may determine whether one or more sub-maps containing the requested media blocks have already been memory mapped. For example, the storage layer 380 determine whether a sub-map containing a media block or media block identifier included in the request is present in the virtual address space. If the storage layer 380 finds a requested media block, the storage layer 380 may return the virtual address range of the media block in response to the request. In some cases, if the sub-map is present in the virtual address space, the storage layer 380 may increment a counter associated with the sub-map (e.g., the storage layer 380 may reference count the sub-map).

Additionally or alternatively, if the storage layer 380 does not find a sub-map containing a media block of the requested media blocks in the virtual address space, the storage layer 380 may memory map the sub-map containing the media block. For example, at 335, the storage layer 380 may issue a request to the operating system 385 for an allocation of the virtual address space (e.g., a request for a range of addresses of the virtual address space for the sub-map).

Upon receiving the request, the operating system 385 may, at 340, map a subset of the virtual address space to a subset of consecutive media blocks (e.g., to the physical addresses of the consecutive media blocks). In some cases, the storage layer 380 may provide a logical file offset range corresponding to the media blocks to the operating system 385, and the operating system 385 may translate the logical file offset range to the physical addresses of the consecutive media blocks. In some cases, the storage layer may identify a file containing a requested media block using the identifier associated with the media block.

At 350, the operating system 385 may allocate a range of addresses in the virtual address space for the one or more media blocks requested at 335, and may issue an indication of the allocation to the storage layer 380. The range of virtual addresses may correspond to the range of addresses (e.g., logical addresses) of the one or more sub-maps in the memory device 310. In some cases, the indication may include the range of virtual addresses, as well as the an indication of the virtual addresses for each of the requested media blocks.

Upon receiving the allocation, the storage layer 380 may add virtual address ranges for each of the requested media blocks in the allocated virtual address space to the cache map created at 325. Subsequently, at 355, the storage layer may return the cache map to the application 375, for example as a response to the request received at 320.

In some cases, upon receiving the cache map, the application 375 may issue a read command to access one or more media blocks. For example, at 360, the application may issue a read command to the operating system 385, and the operating system 385 may transmit the read command to the memory device 310. In some cases, the read command may include the virtual address range for the media block included in the cache map (e.g., the read command may be an example of an address read command). Accordingly, at 365, the operating system 385 may translate the virtual address range to a physical location for the media block. In some case, the media block may not be located in a main memory for the host device 305 (e.g., in a second memory device, such as a DRAM device for the host device 305. In such cases, the operating system 385 may read the media block into the second memory device and issue the media block to the application 375. Additionally or alternatively, if the media block is located in the main memory for the host device 305, the application 375 may retrieve the media block directly from the main memory.

In some examples, at 368, the application 375 may issue an unmap command for a media block. In such cases, the storage layer 380 may, at 370, decrement the counter associated with a sub-map containing the media block. If the value of the counter is greater than a threshold (e.g., greater than zero), the storage layer 380 may determine that another media block of the sub-map may still be active (e.g., that the application 375 may have issued a request for the other media block, but has not issued an unmap command for the other media block). Alternatively, if the value of the counter satisfies the threshold (e.g., if the value of the counter is zero), the storage layer 380 may determine that no media blocks of the sub-map are active. Accordingly, the storage layer 380 may, at 372, instruct the operating system to unmap the sub-map, for example by freeing virtual addresses associated with the sub-map.

Figure 4:
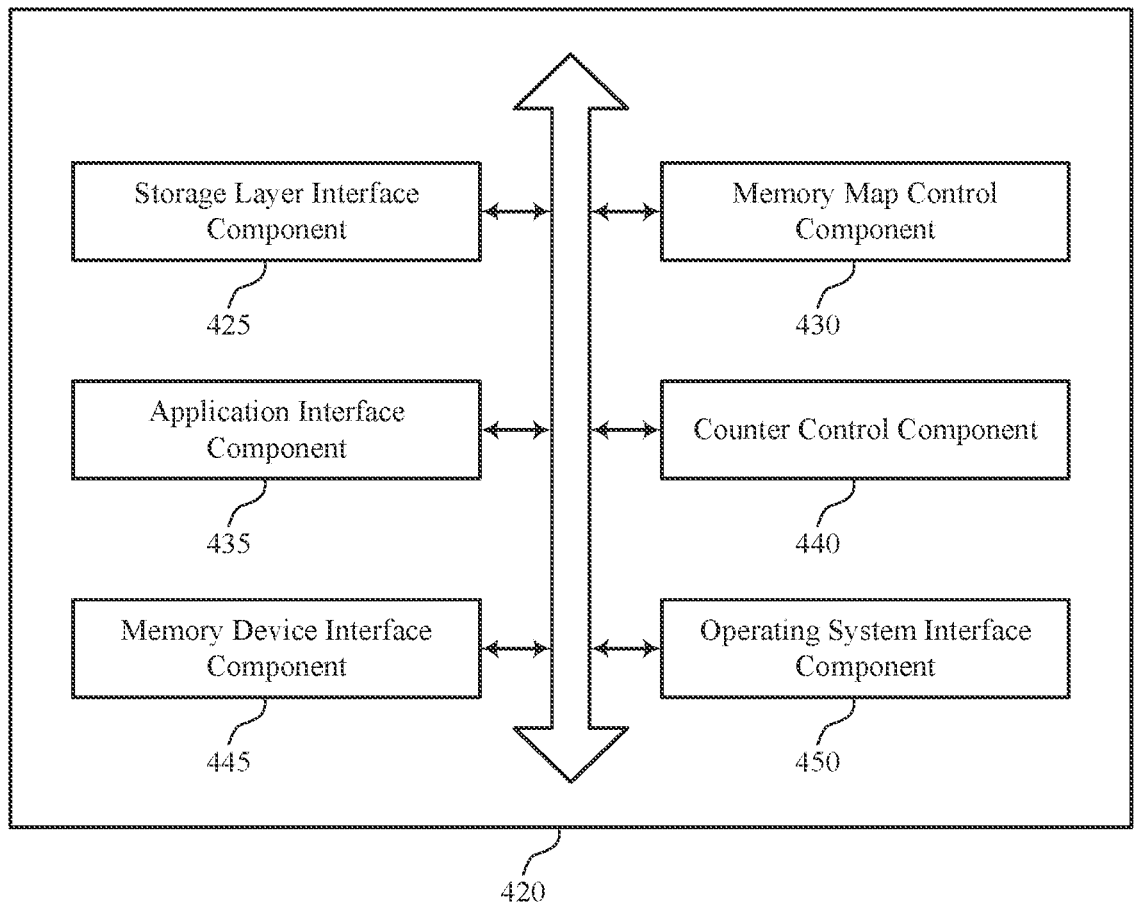
FIG. 4 shows a block diagram of a storage layer that supports techniques to group media blocks in accordance with examples as disclosed herein.

FIG. 4 shows a block diagram 400 of a host device 420 that supports chunked media block maps in accordance with examples as disclosed herein. The host device 420 may be an example of aspects of a host device as described with reference to FIGS. 1 through 3. The host device 420, or various components thereof, may be an example of means for performing various aspects of chunked media block maps as described herein. For example, the host device 420 may include a storage layer interface component 425, a memory map control component 430, an application interface component 435, a counter control component 440, a memory device interface component 445, an operating system interface component 450, or any combination thereof. Each of these components may communicate, directly or indirectly, with one another (e.g., via one or more buses).

The storage layer interface component 425 may be configured as or otherwise support a means for receiving, by a storage layer, a request from an application for a set of virtual addresses of a memory map of a set of media blocks of a memory device, where the memory device includes a set of files, each file including a respective set of media blocks. The memory map control component 430 may be configured as or otherwise support a means for generating, by the storage layer, the memory map in a virtual address space for the application, where the memory map includes a plurality of sub-maps within a consecutive region of the virtual address space, and where each sub-map of the plurality of sub-maps corresponds to a respective subset of consecutive media blocks of one of the set of files. The application interface component 435 may be configured as or otherwise support a means for returning, to the application based on receiving the request, the set of virtual addresses of the memory map corresponding to the set of media blocks.

In some examples, to support generating the memory map, the memory map control component 430 may be configured as or otherwise support a means for mapping a subset of the virtual address space to a subset of consecutive media blocks of a sub-map, the sub-map including a first media block of the set of media blocks.

In some examples, to support generating the memory map, the memory map control component 430 may be configured as or otherwise support a means for mapping a second subset of the virtual address space to a subset of consecutive media blocks of a second sub-map, the second sub-map including a second media block of the set of media blocks, where the sub-map and the second sub-map correspond to different files of the set of files.

In some examples, to support generating the memory map, the memory map control component 430 may be configured as or otherwise support a means for mapping a second subset of the virtual address space to a subset of consecutive media blocks of a second sub-map, the second sub-map including a second media block of the set of media blocks, where the sub-map and the second sub-map correspond to a same file of the set of files.

In some examples, the memory map control component 430 may be configured as or otherwise support a means for determining whether the sub-map is present in the virtual address space. In some examples, the operating system interface component 450 may be configured as or otherwise support a means for requesting, from an operating system, a quantity of addresses of the virtual address space for the sub-map based on determining that the sub-map is not present in the virtual address space. In some examples, the operating system interface component 450 may be configured as or otherwise support a means for receiving an allocation of the quantity of addresses of the virtual address space, where mapping the sub-map is based on receiving the allocation of the quantity of addresses.

In some examples, the storage layer interface component 425 may be configured as or otherwise support a means for receiving, by the storage layer, a second request from the application for a second set of virtual addresses of a second memory map of a second set of media blocks of the memory device, where the memory map and the second memory map include a same sub-map. In some examples, the counter control component 440 may be configured as or otherwise support a means for increasing a value of a counter of the sub-map based on generating the second memory map. In some examples, the application interface component 435 may be configured as or otherwise support a means for returning, to the application based on receiving the second request, the second set of virtual addresses of the second memory map corresponding to the second set of media blocks.

In some examples, the storage layer interface component 425 may be configured as or otherwise support a means for receiving, by the storage layer, a third request to unmap a media block of the sub-map. In some examples, the counter control component 440 may be configured as or otherwise support a means for decreasing the value of the counter of the sub-map based on the third request. In some examples, the counter control component 440 may be configured as or otherwise support a means for determining whether the value of the counter satisfies a threshold. In some examples, the operating system interface component 450 may be configured as or otherwise support a means for suppressing unmapping the media block based on determining that the value of the counter does not satisfy the threshold.

In some examples, the storage layer interface component 425 may be configured as or otherwise support a means for receiving, by the storage layer, a fourth request to unmap the media block of the sub-map. In some examples, the counter control component 440 may be configured as or otherwise support a means for decreasing the value of the counter of the sub-map based on the fourth request. In some examples, the counter control component 440 may be configured as or otherwise support a means for determining whether the value of the counter satisfies the threshold. In some examples, the operating system interface component 450 may be configured as or otherwise support a means for unmapping the media block based on determining that the value of the counter satisfies the threshold.

In some examples, each media block of the set of media blocks is associated with a respective identifier of a plurality of identifiers. In some examples, generating the memory map is based at least in part the plurality of identifiers.

In some examples, the application interface component 435 may be configured as or otherwise support a means for receiving, from the application, a request for a media block of the set of media blocks. In some examples, the memory device interface component 445 may be configured as or otherwise support a means for retrieving the media block from a second memory device based on the memory map. In some examples, the memory device interface component 445 may be configured as or otherwise support a means for returning the media block to the application based on retrieving the media block.

In some examples, the application interface component 435 may be configured as or otherwise support a means for configuring a size of each sub-map of the plurality of sub-maps as part of an initializing procedure for the application.

In some examples, a size of a media block of the set of media blocks corresponds to a preconfigured quantity of pages of the first memory device.

In some examples, the respective virtual addresses of the set of media blocks are discontinuous.

Figure 5:
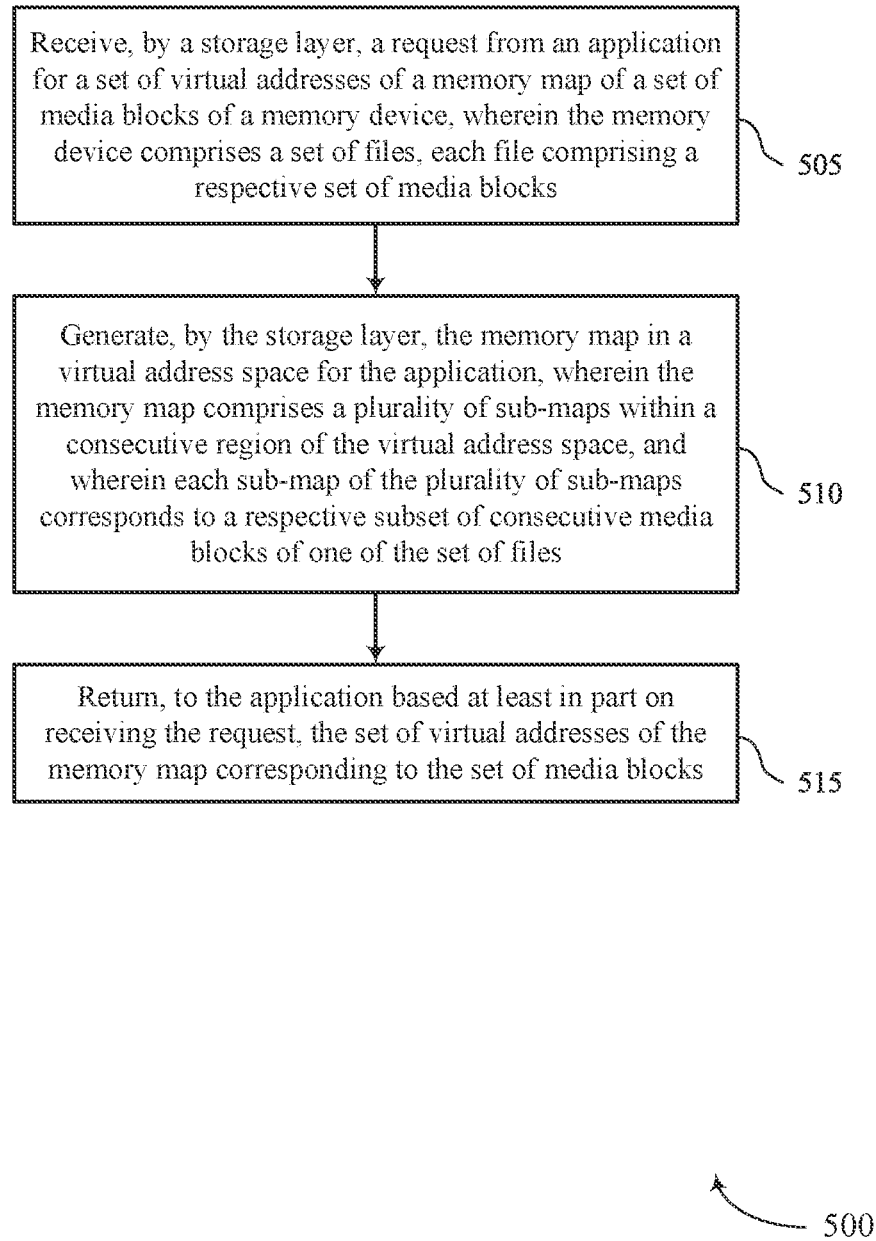
FIG. 5 shows a flowchart illustrating a method or methods that support techniques to group media blocks in accordance with examples as disclosed herein.

FIG. 5 shows a flowchart illustrating a method 500 that supports chunked media block maps in accordance with examples as disclosed herein. The operations of method 500 may be implemented by a host device or its components as described herein. For example, the operations of method 500 may be performed by a host device as described with reference to FIGS. 1 through 4. In some examples, a host device may execute a set of instructions to control the functional elements of the device to perform the described functions. Additionally, or alternatively, the host device may perform aspects of the described functions using special-purpose hardware.

At 505, the method may include receiving, by a storage layer, a request from an application for a set of virtual addresses of a memory map of a set of media blocks of a memory device, where the memory device includes a set of files, each file including a respective set of media blocks. The operations of 505 may be performed in accordance with examples as disclosed herein. In some examples, aspects of the operations of 505 may be performed by a storage layer interface component 425 as described with reference to FIG. 4.

At 510, the method may include generating, by the storage layer, the memory map in a virtual address space for the application, where the memory map includes a plurality of sub-maps within a consecutive region of the virtual address space, and where each sub-map of the plurality of sub-maps corresponds to a respective subset of consecutive media blocks of one of the set of files. The operations of 510 may be performed in accordance with examples as disclosed herein. In some examples, aspects of the operations of 510 may be performed by a memory map control component 430 as described with reference to FIG. 4.

At 515, the method may include returning, to the application based on receiving the request, the set of virtual addresses of the memory map corresponding to the set of media blocks. The operations of 515 may be performed in accordance with examples as disclosed herein. In some examples, aspects of the operations of 515 may be performed by an application interface component 435 as described with reference to FIG. 4.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, by a storage layer, a request from an application for a set of virtual addresses of a memory map of a set of media blocks of a memory device, where the memory device includes a set of files, each file including a respective set of media blocks; generating, by the storage layer, the memory map in a virtual address space for the application, where the memory map includes a plurality of sub-maps within a consecutive region of the virtual address space, and where each sub-map of the plurality of sub-maps corresponds to a respective subset of consecutive media blocks of one of the set of files; and returning, to the application based on receiving the request, the set of virtual addresses of the memory map corresponding to the set of media blocks.

Aspect 2: The method, apparatus, or non-transitory computer-readable medium of aspect 1, where generating the memory map includes operations, features, circuitry, logic, means, or instructions, or any combination thereof for mapping a subset of the virtual address space to a subset of consecutive media blocks of a sub-map, the sub-map including a first media block of the set of media blocks.

Aspect 3: The method, apparatus, or non-transitory computer-readable medium of aspect 2, where generating the memory map further includes operations, features, circuitry, logic, means, or instructions, or any combination thereof for mapping a second subset of the virtual address space to a subset of consecutive media blocks of a second sub-map, the second sub-map including a second media block of the set of media blocks, where the sub-map and the second sub-map correspond to different files of the set of files.

Aspect 4: The method, apparatus, or non-transitory computer-readable medium of any of aspects 2 through 3, where generating the memory map further includes operations, features, circuitry, logic, means, or instructions, or any combination thereof for mapping a second subset of the virtual address space to a subset of consecutive media blocks of a second sub-map, the second sub-map including a second media block of the set of media blocks, where the sub-map and the second sub-map correspond to a same file of the set of files.

Aspect 5: The method, apparatus, or non-transitory computer-readable medium of any of aspects 2 through 4, further including operations, features, circuitry, logic, means, or instructions, or any combination thereof for determining whether the sub-map is present in the virtual address space; requesting, from an operating system, a quantity of addresses of the virtual address space for the sub-map based on determining that the sub-map is not present in the virtual address space; and receiving an allocation of the quantity of addresses of the virtual address space, where mapping the sub-map is based on receiving the allocation of the quantity of addresses.

Aspect 6: The method, apparatus, or non-transitory computer-readable medium of any of aspects 1 through 5, further including operations, features, circuitry, logic, means, or instructions, or any combination thereof for receiving, by the storage layer, a second request from the application for a second set of virtual addresses of a second memory map of a second set of media blocks of the memory device, where the memory map and the second memory map include a same sub-map; increasing a value of a counter of the sub-map based on generating the second memory map; and returning, to the application based on receiving the second request, the second set of virtual addresses of the second memory map corresponding to the second set of media blocks.

Aspect 7: The method, apparatus, or non-transitory computer-readable medium of aspect 6, further including operations, features, circuitry, logic, means, or instructions, or any combination thereof for receiving, by the storage layer, a third request to unmap a media block of the sub-map; decreasing the value of the counter of the sub-map based on the third request; determining whether the value of the counter satisfies a threshold; and suppressing unmapping the media block based on determining that the value of the counter does not satisfy the threshold.

Aspect 8: The method, apparatus, or non-transitory computer-readable medium of aspect 7, further including operations, features, circuitry, logic, means, or instructions, or any combination thereof for receiving, by the storage layer, a fourth request to unmap the media block of the sub-map; decreasing the value of the counter of the sub-map based on the fourth request; determining whether the value of the counter satisfies the threshold; and unmapping the media block based on determining that the value of the counter satisfies the threshold.

Aspect 9: The method, apparatus, or non-transitory computer-readable medium of any of aspects 1 through 8, where each media block of the set of media blocks is associated with a respective identifier of a plurality of identifiers and generating the memory map is based at least in part the plurality of identifiers.

Aspect 10: The method, apparatus, or non-transitory computer-readable medium of any of aspects 1 through 9, further including operations, features, circuitry, logic, means, or instructions, or any combination thereof for receiving, from the application, a request for a media block of the set of media blocks; retrieving the media block from a second memory device based on the memory map; and returning the media block to the application based on retrieving the media block.

Aspect 11: The method, apparatus, or non-transitory computer-readable medium of any of aspects 1 through 10, further including operations, features, circuitry, logic, means, or instructions, or any combination thereof for configuring a size of each sub-map of the plurality of sub-maps as part of an initializing procedure for the application.

Aspect 12: The method, apparatus, or non-transitory computer-readable medium of any of aspects 1 through 11, where a size of a media block of the set of media blocks corresponds to a preconfigured quantity of pages of the first memory device.

Aspect 13: The method, apparatus, or non-transitory computer-readable medium of any of aspects 1 through 12, where the respective virtual addresses of the set of media blocks are discontinuous.

It should be noted that the methods described herein describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component (e.g., a transistor) discussed herein may represent a field-effect transistor (FET), and may comprise a three-terminal component including a source (e.g., a source terminal), a drain (e.g., a drain terminal), and a gate (e.g., a gate terminal). The terminals may be connected to other electronic components through conductive materials (e.g., metals, alloys). The source and drain may be conductive, and may comprise a doped (e.g., heavily-doped, degenerate) semiconductor region. The source and drain may be separated by a doped (e.g., lightly-doped) semiconductor region or channel. If the channel is n-type (e.g., majority carriers are electrons), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
   receiving, by a storage layer, a request from an application for a memory map of a set of media blocks of a memory device, wherein the memory device comprises a set of files, each file comprising a respective set of media blocks;
   generating, by the storage layer, the memory map in a virtual address space for the application, wherein the memory map comprises a plurality of sub-maps within a consecutive region of the virtual address space, and wherein each sub-map of the plurality of sub-maps corresponds to a respective subset of consecutive media blocks of one of the set of files; and
   returning, to the application based on receiving the request, a set of virtual addresses of the memory map corresponding to the set of media blocks.

2. The method of claim 1, wherein generating the memory map comprises:
   mapping a subset of the virtual address space corresponding to a sub-map of the plurality of sub-maps to a first subset of consecutive media blocks, the first subset of consecutive media blocks comprising a first media block of the set of media blocks.

3. The method of claim 2, wherein generating the memory map further comprises:
   mapping a second subset of the virtual address space corresponding to a second sub-map of the plurality of sub-maps to a second subset of consecutive media blocks, the second subset of consecutive media blocks comprising a second media block of the set of media blocks, wherein the sub-map and the second sub-map correspond to different files of the set of files.

4. The method of claim 2, wherein generating the memory map further comprises:
   mapping a second subset of the virtual address space corresponding to a second sub-map of the plurality of sub-maps to a second subset of consecutive media blocks, the second subset of consecutive media blocks comprising a second media block of the set of media blocks, wherein the sub-map and the second sub-map correspond to a same file of the set of files.

5. The method of claim 2, further comprising:
   determining whether the sub-map is present in the virtual address space;
   requesting, from an operating system, a quantity of addresses of the virtual address space for the sub-map based on determining that the sub-map is not present in the virtual address space; and
   receiving an allocation of the quantity of addresses of the virtual address space, wherein mapping the sub-map is based on receiving the allocation of the quantity of addresses.

6. The method of claim 1, further comprising:
   receiving, by the storage layer, a second request from the application for a second memory map of a second set of media blocks of the memory device, wherein the second set of media blocks comprises a media block mapped by a sub-map of the memory map;
   increasing a value of a counter of the sub-map based on generating the second memory map; and
   returning, to the application based on receiving the second request, a second set of virtual addresses of the second memory map corresponding to the second set of media blocks.

7. The method of claim 6, further comprising:
   receiving, by the storage layer, a third request to unmap a media block of the sub-map;
   decreasing the value of the counter of the sub-map based on the third request;
   determining whether the value of the counter satisfies a threshold; and
   suppressing unmapping the media block based on determining that the value of the counter does not satisfy the threshold.

8. The method of claim 7, further comprising:
   receiving, by the storage layer, a fourth request to unmap the media block of the sub-map;
   decreasing the value of the counter of the sub-map based on the fourth request;

determining whether the value of the counter satisfies the threshold; and unmapping the media block based on determining that the value of the counter satisfies the threshold.

9. The method of claim 1, wherein each media block of the set of media blocks is associated with a respective identifier of a plurality of identifiers, and generating the memory map is based at least in part the plurality of identifiers.

10. The method of claim 1, further comprising:
configuring a size of each sub-map of the plurality of sub-maps as part of an initializing procedure for the application.

11. The method of claim 1, wherein a size of a media block of the set of media blocks corresponds to a preconfigured quantity of pages of the memory device.

12. The method of claim 1, wherein the respective virtual addresses of the set of media blocks are discontinuous.

13. An apparatus, comprising: a controller associated with a host device, wherein the controller is configured to cause the apparatus to:

receive, by a storage layer, a request from an application for a set of virtual addresses of a memory map of a set of media blocks of a memory device, wherein the memory device comprises a set of files, each file comprising a respective set of media blocks;

generate, by the storage layer, the memory map in a virtual address space for the application, wherein the memory map comprises a plurality of sub-maps within a consecutive region of the virtual address space, and wherein each sub-map of the plurality of sub-maps corresponds to a respective subset of consecutive media blocks of one of the set of files; and return, to the application based on receiving the request, the set of virtual addresses of the memory map corresponding to the set of media blocks.

14. The apparatus of claim 13, wherein generating the memory map is configured to cause the apparatus to:
map a subset of the virtual address space corresponding to a sub-map of the plurality of sub-maps to a first subset of consecutive media blocks, the first subset of consecutive media blocks comprising a first media block of the set of media blocks.

15. The apparatus of claim 14, wherein generating the memory map is further configured to cause the apparatus to:
map a second subset of the virtual address space corresponding to a second sub-map of the plurality of sub-maps to a second subset of consecutive media blocks, the second subset of consecutive media blocks comprising a second media block of the set of media blocks, wherein the sub-map and the second sub-map correspond to different files of the set of files.

16. The apparatus of claim 14, wherein generating the memory map is further configured to cause the apparatus to:
map a second subset of the virtual address space corresponding to a second sub-map of the plurality of sub-maps to a second subset of consecutive media blocks, the second subset of consecutive media blocks comprising a second media block of the set of media blocks, wherein the sub-map and the second sub-map correspond to a same file of the set of files.

17. The apparatus of claim 14, wherein the controller is further configured to cause the apparatus to:
determine whether the sub-map is present in the virtual address space;

request, from an operating system, a quantity of addresses of the virtual address space for the sub-map based on determining that the sub-map is not present in the virtual address space; and receive an allocation of the quantity of addresses of the virtual address space, wherein mapping the sub-map is based on receiving the allocation of the quantity of addresses.

18. The apparatus of claim 13, wherein the controller is further configured to cause the apparatus to:
receive, by the storage layer, a second request from the application for a second set of virtual addresses of a second memory map of a second set of media blocks of the memory device, wherein the second set of media blocks comprises a media block mapped by a sub-map of the memory map;

increase a value of a counter of the sub-map based on generating the second memory map; and return, to the application based on receiving the second request, the second set of virtual addresses of the second memory map corresponding to the second set of media blocks.

19. The apparatus of claim 18, wherein the controller is further configured to cause the apparatus to:
receive, by the storage layer, a third request to unmap a media block of the sub-map;

decrease the value of the counter of the sub-map based on the third request;

determine whether the value of the counter satisfies a threshold; and suppress unmapping the media block based on determining that the value of the counter does not satisfy the threshold.

20. The apparatus of claim 19, wherein the controller is further configured to cause the apparatus to:
receive, by the storage layer, a fourth request to unmap the media block of the sub-map;

decrease the value of the counter of the sub-map based on the fourth request;

determine whether the value of the counter satisfies the threshold; and unmap the media block based on determining that the value of the counter satisfies the threshold.

21. The apparatus of claim 13, wherein:
each media block of the set of media blocks is associated with a respective identifier of a plurality of identifiers, and generating the memory map is based at least in part the plurality of identifiers.

22. The apparatus of claim 13, wherein the controller is further configured to cause the apparatus to:
configure a size of each sub-map of the plurality of sub-maps as part of an initializing procedure for the application.

23. A non-transitory computer-readable medium storing code, the code comprising instructions executable by a processor to:

receive, by a storage layer, a request from an application for a set of virtual addresses of a memory map of a set of media blocks of a memory device, wherein the memory device comprises a set of files, each file comprising a respective set of media blocks;

generate, by the storage layer, the memory map in a virtual address space for the application, wherein the memory map comprises a plurality of sub-maps within a consecutive region of the virtual address space, and wherein each sub-map of the plurality of sub-maps corresponds to a respective subset of consecutive media blocks of one of the set of files; and return, to the application based on receiving the request, the set of virtual addresses of the memory map corresponding to the set of media blocks.

24. The non-transitory computer-readable medium of claim 23, wherein the instructions are further executable by the processor to:

map a subset of the virtual address space corresponding to a sub-map of the plurality of sub-maps to a first subset of consecutive media blocks, the first subset of consecutive media blocks comprising a first media block of the set of media blocks.

25. The non-transitory computer-readable medium of claim 24, wherein the instructions are further executable by the processor to:

map a second subset of the virtual address space corresponding to a second sub-map of the plurality of sub-maps to a second subset of consecutive media blocks, the second subset of consecutive media blocks comprising a second media block of the set of media blocks, wherein the sub-map and the second sub-map correspond to different files of the set of files.

* * * * *